United States Patent
Groux et al.

(10) Patent No.: US 9,208,754 B2
(45) Date of Patent: Dec. 8, 2015

(54) METHOD AND APPARATUS FOR CONTROLLING A DISPLAY OF A PORTABLE ELECTRONIC DEVICE

(75) Inventors: Brian Groux, Waterloo (CA); Aaron Scriver, Waterloo (CA); Michael T. Hardy, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 1840 days.

(21) Appl. No.: 12/359,443

(22) Filed: Jan. 26, 2009

(65) Prior Publication Data
US 2010/0188431 A1    Jul. 29, 2010

(51) Int. Cl.
G09G 5/00 (2006.01)
G09G 5/34 (2006.01)
G06F 3/0482 (2013.01)
G06F 3/0485 (2013.01)
G09G 5/397 (2006.01)

(52) U.S. Cl.
CPC .............. *G09G 5/346* (2013.01); *G06F 3/0482* (2013.01); *G06F 3/0485* (2013.01); *G09G 5/397* (2013.01); *G09G 2310/04* (2013.01)

(58) Field of Classification Search
USPC .................................................. 345/684, 689
See application file for complete search history.

(56) References Cited

U.S. PATENT DOCUMENTS

| | | | |
|---|---|---|---|
| 6,642,945 B1 | 11/2003 | Sharpe | |
| 6,690,401 B1 | 2/2004 | Stead | |
| 7,496,385 B2 * | 2/2009 | Gruen et al. | 455/566 |
| 7,557,818 B1 * | 7/2009 | Ubillos et al. | 345/684 |
| 7,564,467 B2 * | 7/2009 | Haneda et al. | 345/619 |
| 2001/0012000 A1 | 8/2001 | Eberhard | |
| 2002/0030667 A1 | 3/2002 | Hinckley et al. | |
| 2004/0021647 A1 | 2/2004 | Iwema et al. | |
| 2004/0135797 A1 * | 7/2004 | Meier et al. | 345/684 |
| 2004/0150630 A1 | 8/2004 | Hinckley et al. | |
| 2006/0038796 A1 | 2/2006 | Hinckley et al. | |
| 2006/0044285 A1 | 3/2006 | Sato et al. | |
| 2006/0123360 A1 | 6/2006 | Anwar et al. | |
| 2006/0253801 A1 | 11/2006 | Okaro et al. | |

(Continued)

FOREIGN PATENT DOCUMENTS

EP    0 949 559 B1    3/2003
EP    1942400 A    7/2008

OTHER PUBLICATIONS http://www.iphonehacks.com/2007/08/iphonehack-dock.html.

(Continued)

*Primary Examiner* — Motilewa Good-Johnson
(74) *Attorney, Agent, or Firm* — Perry + Currier, Inc.

(57) ABSTRACT

A method and apparatus for controlling a display of a portable electronic device are provided. The method comprises generating a screen comprising a list on the display. The list comprises one or more row elements, with each row element comprising one or more column sub-elements. At least a portion of one of the column sub-elements of at least one of the row elements is truncated. Upon selection of a row element, the screen is enabled for scrolling of that row element. Enabling scrolling comprises loading the truncated portion of the selected row element into a pre-buffer. The method further comprises receiving a scrolling input, and updating the screen on the display to scroll the row element, bringing the truncated portion into view. The selected row is scrolled while maintaining the series of column sub-elements in the row without reference to other rows.

2 Claims, 10 Drawing Sheets

(56) References Cited

U.S. PATENT DOCUMENTS

| | | | |
|---|---|---|---|
| 2006/0256138 A1* | 11/2006 | Haneda et al. | 345/684 |
| 2006/0268019 A1* | 11/2006 | Wang et al. | 345/684 |
| 2007/0067710 A1 | 3/2007 | Clark et al. | |
| 2007/0139386 A1 | 6/2007 | Martin et al. | |
| 2007/0209018 A1* | 9/2007 | Lindemann | 715/784 |
| 2007/0250786 A1 | 10/2007 | Jeon et al. | |
| 2008/0111795 A1 | 5/2008 | Bollinger | |
| 2008/0171535 A1 | 7/2008 | Carmody et al. | |
| 2009/0015600 A1* | 1/2009 | Ouchi | 345/684 |

OTHER PUBLICATIONS iPhoneHacks, "Dock: The iPhone hack which enables scrolling on iPhone's home screen" Aug. 31, 2007, http://www.Iphonehacks.com/2007/08/phonehack-dock.html.

European Patent Application No. EP 09 15 1304—Search Report dated May 29, 2009.

"The Futrue is Multi Touch" Demonstration Video: http://multi-touchscreen.com/.

\* cited by examiner

| Date rec'd | Sender | Subject |
|---|---|---|
| 12/05/2008 | bob@acme | Dinner at 8? |
| 12/05/2008 | al@acme | Re: Dinner at 8? |
| 12/05/2008 | biff@acme | Planned modifica |

METHOD AND APPARATUS FOR CONTROLLING A DISPLAY OF A PORTABLE ELECTRONIC DEVICE

FIELD OF THE INVENTION

The present invention relates in general to portable electronic devices, and more particularly to a method and apparatus for controlling a display of a portable electronic device.

BACKGROUND OF THE INVENTION

As portable electronic devices and other computing devices become more powerful, the functionality provided by such devices continues to expand and improve. Display space, however, is an area in which improvement is more difficult, as stringent size constraints are often imposed on portable electronic devices. These constraints limit the volume of information which can be provided at any given time on the display of a portable electronic device. As, a result, the information displayed on portable electronic devices is often truncated, with some information remaining invisible. Making such truncated information visible often results in undesirable use of the portable electronic device's resources, or negatively affects the usefulness of the originally displayed information.

BRIEF DESCRIPTION OF THE DRAWINGS

Embodiments will be described below with reference to the following figures, in which.

DETAILED DESCRIPTION OF THE EMBODIMENTS

Figure 1:
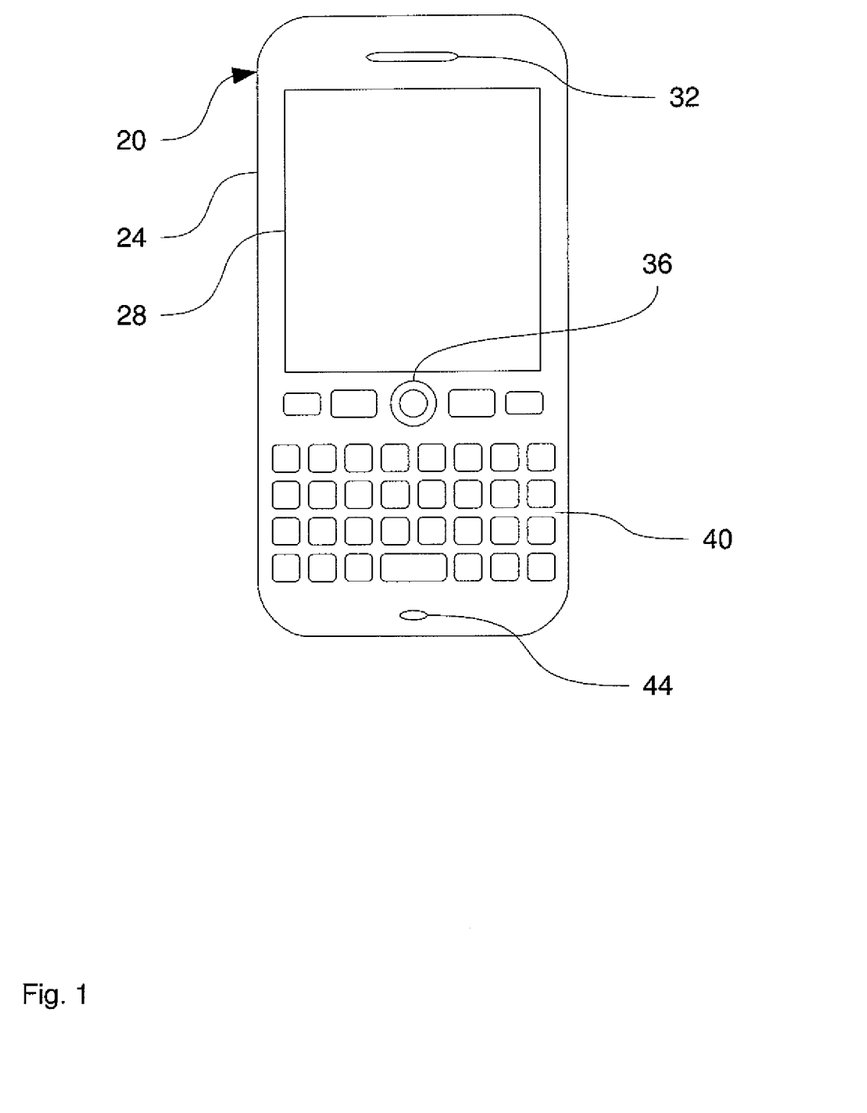
FIG. 1 shows a schematic representation of a portable electronic device.

Referring now to FIG. 1, a schematic representation of a portable electronic device is indicated generally at 20. In the present embodiment, portable electronic device 20 is based on the computing environment and functionality of a hand-held wireless communication device. It will be understood, however, that portable electronic device 20 is not limited to a hand-held wireless communication device. Other electronic devices are possible, such as cellular telephones, smart telephones, and laptop computers. Referring again to FIG. 1, portable electronic device 20 includes a housing 24 which frames a display 28. Housing 24 is constructed of a suitable material as will occur to those skilled in the art. Display 28 may be, for example, an LCD display, and may also be combined with or implemented as a touch screen. Portable electronic device 20 also includes a speaker 32 and a pointing device 36 which in the present embodiment is a trackball. It will be understood that in some embodiments, pointing device 36 may also comprise a touch screen integrated with display 28. Portable electronic device 20 also includes a keypad 40 and a microphone 44.

Figure 2:
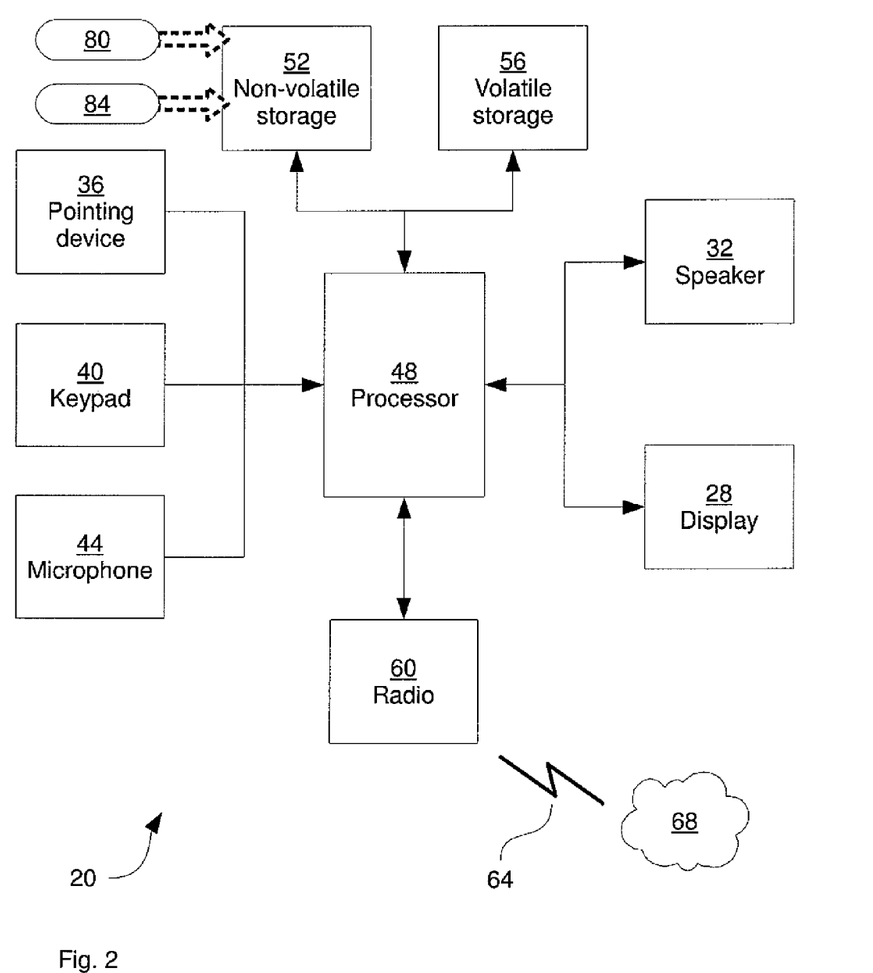
FIG. 2 shows a block diagram of various internal components of the portable electronic device of FIG. 1.

Referring now to FIG. 2, a schematic block diagram shows portable electronic device 20 in greater detail. It will be understood that the structure in FIG. 2 is purely exemplary, and contemplates a device that may be used for both wireless voice (e.g. telephony) and wireless data (e.g. email, web browsing, text) communications. Portable electronic device 20 includes input devices such as pointing device 36, keypad 40 and microphone 44. It will be noted that pointing device 36, which in the present embodiment is a trackball, may also be a touch screen or a trackwheel. Other input devices, such as a camera lens and associated image sensor (not shown), are also contemplated. Portable electronic device 20 is based on a microcomputer that includes a processor 48. Input from pointing device 36, keypad 40 and microphone 44 may be received at processor 48. Processor 48, in turn, communicates with a non-volatile storage unit 52 (e.g. read only memory ("ROM"), Electrically Eraseable Programmable Read Only Memory ("EEPROM"), flash memory) and a volatile storage unit 56 (e.g. Random Access Memory ("RAM")).

Portable electronic device 20 also includes a radio 60 communicating with processor 48. Radio 60 provides wireless communication capabilities to portable electronic device 20 by way of a wireless link 64 connecting portable electronic device 20 to a network 68. Link 64 between portable electronic device 20 and network 68 may be based in a present embodiment on core mobile network infrastructure (e.g. Global System for Mobile communications ("GSM"); Code Division Multiple Access ("CDMA"); CDMA 2000; 3G; 4G). Link 64 may also be based on wireless local area network ("WLAN") infrastructures such as the Institute for Electrical and Electronic Engineers ("IEEE") 802.11 Standard (and its variants), Bluetooth or the like, or hybrids thereof. Note that in an exemplary variation of portable electronic device 20, link 64 may also be a wired connection and radio 60 may be a network interface device capable of receiving the wired connection.

Programming instructions that implement the functional teachings of portable electronic device 20 as described herein are typically maintained, persistently, in non-volatile storage unit 52 and used by processor 48 which makes appropriate utilization of volatile storage unit 56 during the execution of such programming instructions. Of particular note is that non-volatile storage unit 52 persistently maintains a messaging application 80. It will be understood that other applications are also contemplated, and that messaging application 80 is purely exemplary. Messaging application 80 may be executed on processor 48, making use of non-volatile storage unit 52 and volatile storage unit 56 as appropriate. Non-volatile storage unit 52 also maintains a display application 84 for controlling display 28 of portable electronic device 20. Display application 84 may also be executed on processor 48, making appropriate use of non-volatile storage unit 52 and volatile storage unit 56. Display application 84 controls display 28 by way of display buffers (not shown), as will be described in further detail below. It will be understood that display application 84 may also be integrated with messaging application 80, or with any other of the various applications which may also be maintained in non-volatile storage unit 52 according to the desired configuration and functioning of portable electronic device 20.

Figure 3:
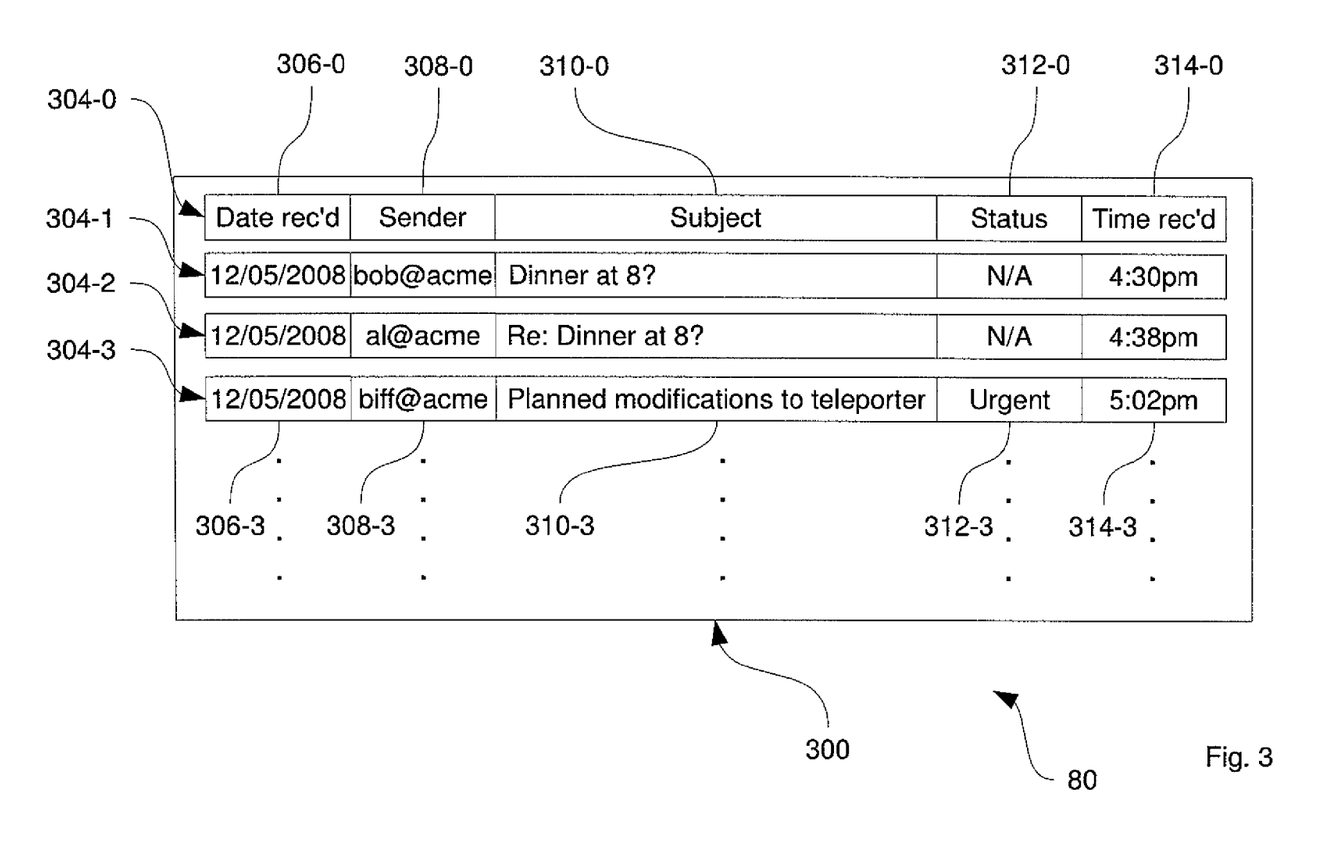
FIG. 3 shows a database storing data for a messaging application on the portable electronic device of FIG. 1.

Referring now to FIG. 3, messaging application 80 may include a database 300 containing data representing messages. In the present embodiment, database 300 comprises a plurality of rows 304-0, 304-1, 304-2, 304-3 (generically referred to as row 304 and collectively referred to as rows 304). It will be understood that database 300 may comprise additional rows or fewer rows as necessary, and that the number of rows 304 shown in FIG. 3 is purely exemplary. Each row 304 comprises fields. For example, row 304-3 comprises fields 306-3, 308-3, 310-3, 312-3 and 314-3. It will be understood that rows 304-1 and 304-2 similarly comprise, respectively, fields 306-1 to 314-1 and fields 306-2 to 314-2. Of note is that the fields of database 300 are arranged substantially in columns. For example, fields 306-0 to 306-3 are arranged in one column, fields 308-0 to 308-3 in another column, and so on.

The fields of each column may contain like information. That is, fields 306-1, 306-2 and 306-3 may, for example, contain data representing a certain category of information. It will be understood, however, that this is not a necessity. It will be noted that in the present embodiment, row 304-0 of database 300 acts as a header row. The fields of row 304-0 may therefore contain data representing the category of information contained in each corresponding column. In the present embodiment, for example, field 306-0 contains data representing an indication that fields 306-1 to 306-3 contain information relating to the date a message was received. Fields 308-0, 310-0, 312-0 and 314-0 likewise contain data representing indications of other categories of information—sender, subject, status and time received, respectively. Rows 304-1, 304-2 and 304-3 have been completed with exemplary data corresponding to the exemplary categories indicated in row 304-0. It will be understood that although the body of the messages represented in database 300 is not shown and may be stored elsewhere, database 300 may also be extended to include the body of a message.

Figure 4:
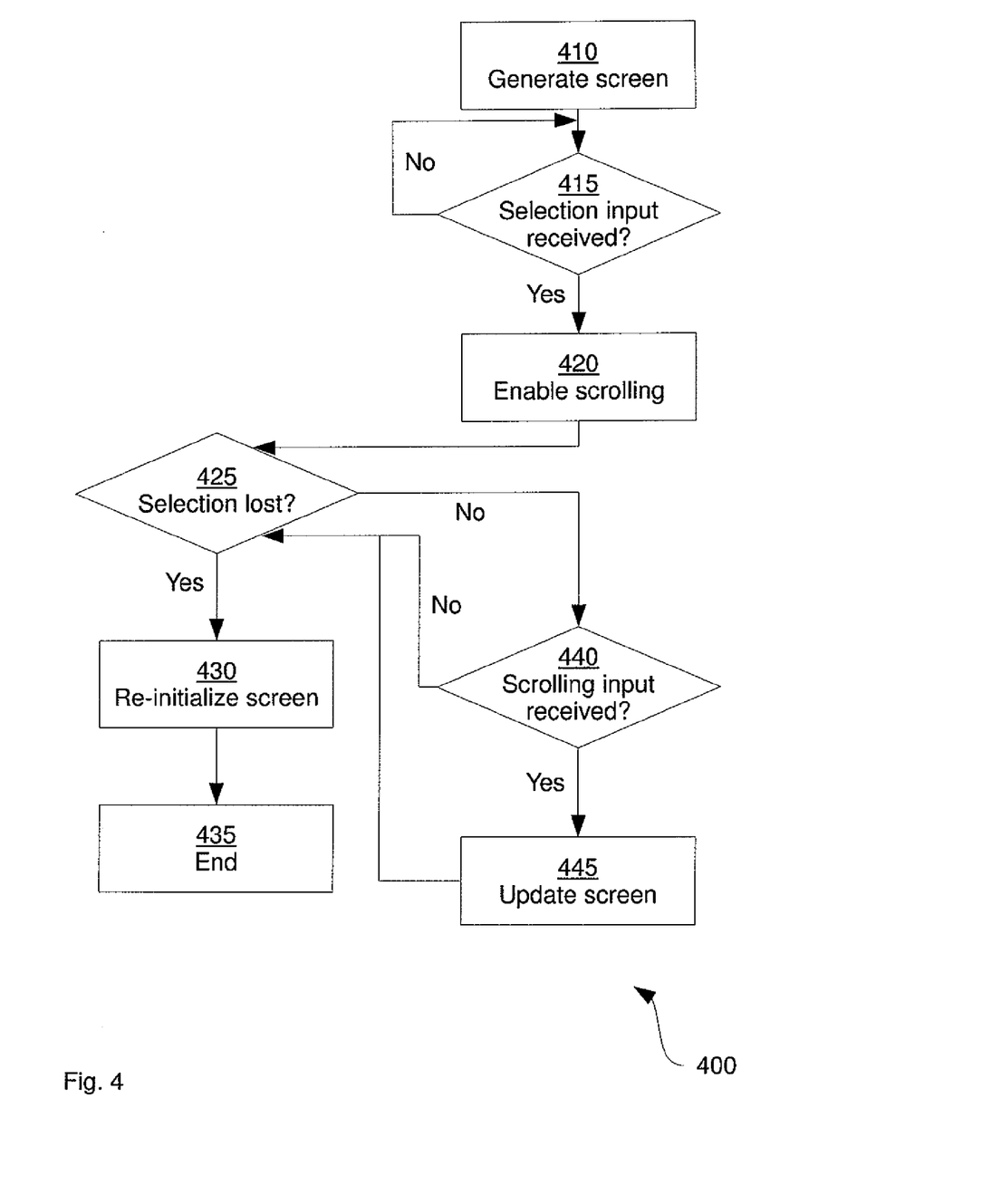
FIG. 4 shows a flowchart of a method of controlling a display of the portable electronic device of FIG. 1.

Referring now to FIG. 4, a flow-chart is provided depicting a method, indicated generally at 400, for controlling a display on a portable electronic device. Method 400 will be described in conjunction with its exemplary performance on portable electronic device 20, but it will be understood that portable electronic device 20 and method 400 may both be varied within the scope of the present teachings. For example, it will be noted that the exemplary performance of method 400 relates only to some columns within database 300. As will be appreciated by those skilled in the art, various other combinations of columns may also be used.

Figure 5:
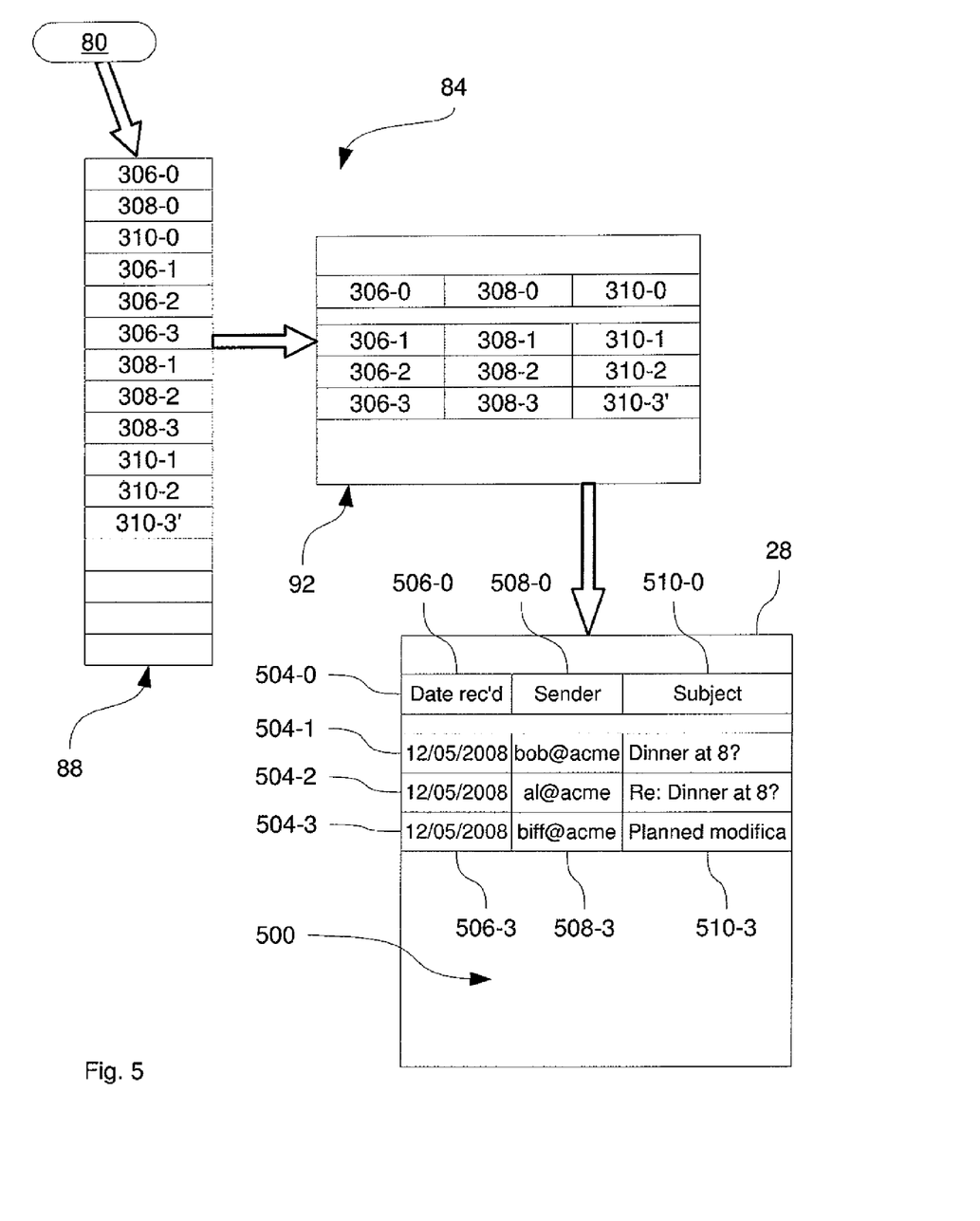
FIG. 5 shows an exemplary performance of block 410 of the method of FIG. 4.

Block 410 comprises generating a screen on display 28 of portable electronic device 20. In the present embodiment, block 410 is performed by display application 84. Referring to FIG. 5, the performance of block 410 is depicted. Display application 84 manages a screen pre-buffer 88 and a screen buffer 92. It will be appreciated that screen pre-buffer 88 and screen buffer 92 may be, for example, comprised of a plurality of blocks of memory in volatile storage unit 56 of portable electronic device 20. As part of the performance of block 410, display application 84 is configured to obtain data representing messages from database 300 of messaging application 80. It will be understood that the determination of which data is to be obtained from database 300 may be made in a variety of ways. In a present embodiment, for example, display application 84 may store a width of display 28. Display application 84 may then obtain as much data from each row 304 of database 300 as can be displayed in the width of display 28.

As shown in FIG. 5, display application 84 manages screen pre-buffer 88 and screen buffer 92 by obtaining the data contained in fields 306 and 308. Data contained within fields 310-0, 310-1 and 310-2 is also obtained and stored within screen pre-buffer 88. It will be noted, however, that a modified version of field 310-3 has been stored, indicated at 310-3'. Continuing with the performance of block 410, display application 84 manages screen buffer 92 to obtain data from screen pre-buffer 88. At block 410, screen pre-buffer 88 contains only that data which will be displayed immediately, and thus the contents obtained by screen buffer 92 matches the contents of screen pre-buffer 88. In completing the performance of block 410, display application 84 is configured to generate, or render, a screen 500 on display 28 of portable electronic device 20 according to the data contained in screen buffer 92. Screen 500 comprises row elements 504-0, 504-1, 504-2 and 504-3. It will be noted that row element 504-0 acts as a header row element. Each row element 504 of screen 500 comprises column sub-elements 506, 508, and 510. In the present embodiment, column sub elements 506 of rows 504-1, 504-2 and 504-3 contain like information (e.g. date received), as do column sub-elements 508 and 510. The categories of information contained in respective sets of column sub-elements are indicated by corresponding column sub-elements 506-0, 508-0 and 510-0. It will be understood, however, that this is not a necessity. While the entirety of row elements 504-0, 504-1 and 504-2 of screen 500 correspond to portions of their respective rows 304-0, 304-1 and 304-2 of database 300, column sub-element 510-3 corresponds to only a portion of the data contained within field 310-3 of database 300. The contents of field 310-3 has been determined by display application 84 to be too long for complete display on portable electronic device 20, and has therefore been truncated. Field 310-3' within screen pre-buffer 88 and screen buffer 92 represents only the portion of field 310-3 which is displayed in screen 500 as column sub-element 510-3. The remainder of field 310-3 has not been obtained by display application 84.

Returning to FIG. 4, at block 415 a determination is made as to whether selection input has been received to select, or focus, a particular row element of screen 500 on display 28 of portable electronic device 20. Selection input may be received by processor 48 from an input device of portable electronic device 20. For example, selection input may be a touch on a touch screen, a scroll of a trackball or a click of a keypad button. Various other selection inputs are contemplated, as will be understood by those skilled in the art.

Figure 6:
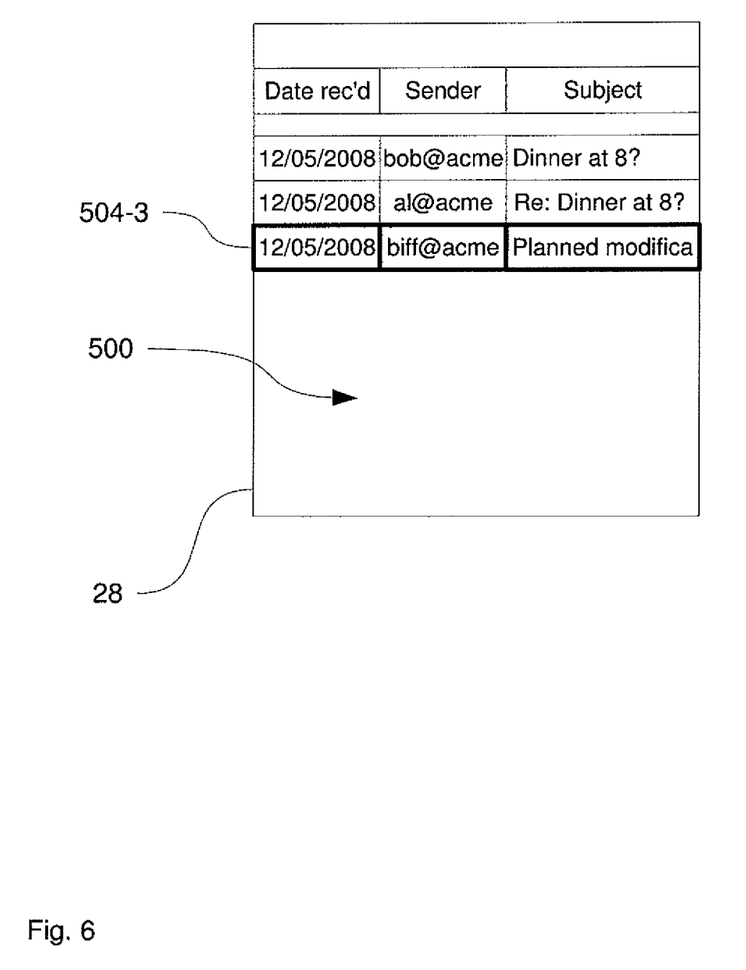
FIG. 6 shows an exemplary performance of block 415 of the method of FIG. 4.

If a "No" determination is made at block 415, method 400 waits at block 415 until a selection input is received. If a "Yes" determination is made at block 415, method 400 proceeds to block 420 to enable scrolling. Receipt of selection input is illustrated in FIG. 6, where row element 504-3 has been selected, for example by a touch on a touch screen input device. On selection of row 504-3, display application 84 may update screen 500 to indicate the selection by way of bolded lines surrounding row element 504-3. It will be understood that a wide variety of other indications of selection may be used, however, and that display application 84 as described herein need not necessarily be responsible for such indications.

Figure 7:
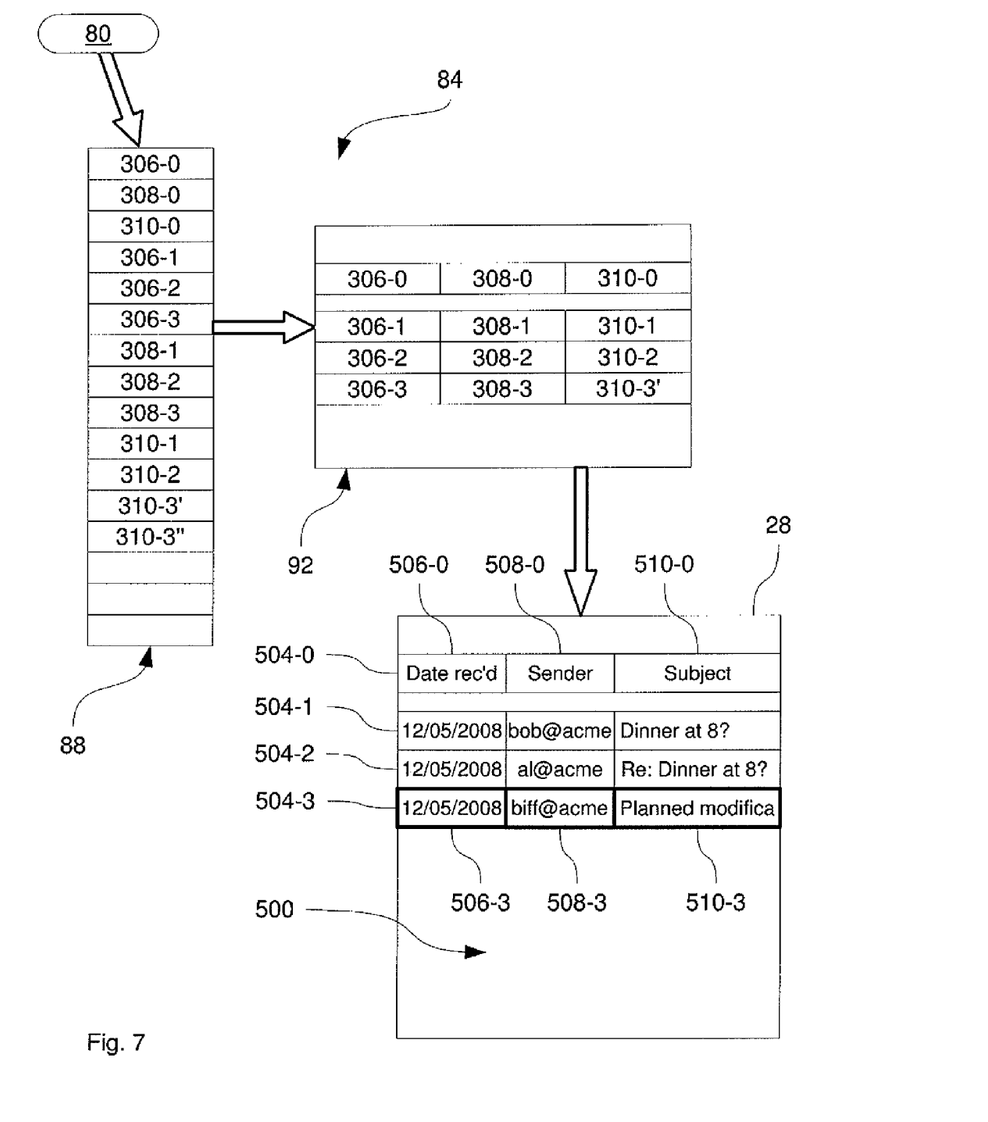
FIG. 7 shows an exemplary performance of block 420 of the method of FIG. 4.

Performance of block 420 is shown in FIG. 7. Display application 84 is configured to manage screen pre-buffer 88 to obtain the remainder of truncated field 310-3 of database 300. As shown in FIG. 7, additional capacity has been used in volatile storage unit 56 of portable electronic device 20 to store field 310-3". Field 310-3" contains the remainder of field 310-3 truncated from screen 500. In the present example, therefore, the contents of field 310-3" is, "tions to teleporter."

Note that the contents of screen buffer 92 has not yet been modified, and that screen 500 therefore also remains unchanged aside from the optional highlighting of selected row element 504-3. It will be noted, as mentioned earlier, that fields 312 and 314 of database 300 are not shown in FIG. 5. For the current exemplary performance of method 400, fields 312 and 314 are not being used in messaging application 80. As will be appreciated by those skilled in the art, messaging application 80 may be configurable to select various combinations of fields from database 300 for display. As such, if it were desired to use fields 312 and 314, their contents would also be obtained by display application 84 for screen pre-buffer 88 at block 420 of method 400.

Returning to FIG. 4, method 400 then proceeds to block 425, at which a determination is made as to whether the selection received at block 415 has been lost. As will be appreciated by those skilled in the art, selection may be lost in a variety of ways. For example, a different row may be selected, overriding the current selection. As a further, non-limiting example, an "escape" key or the like on keypad 40 may be pressed which voids the current selection without replacing it with another selection.

If a "Yes" determination is made at block 425, method 400 proceeds to block 430, at which screen 500 on display 28 is "re-initialized," followed by block 435, at which method 400 is terminated. The performance of block 430 will be described in further detail below.

If a "No" determination is made at block 425, method 400 proceeds to block 440, at which a determination is made as to whether scrolling input has been received. Scrolling input may be in the form of a finger drag on a touch screen, or a roll of a trackball, for example. If a "No" determination is made at block 440, method 400 returns to block 425. If a "Yes" determination is made at block 440, method 400 advances to block 445, where the screen rendered on display 28 is updated.

Figure 8:
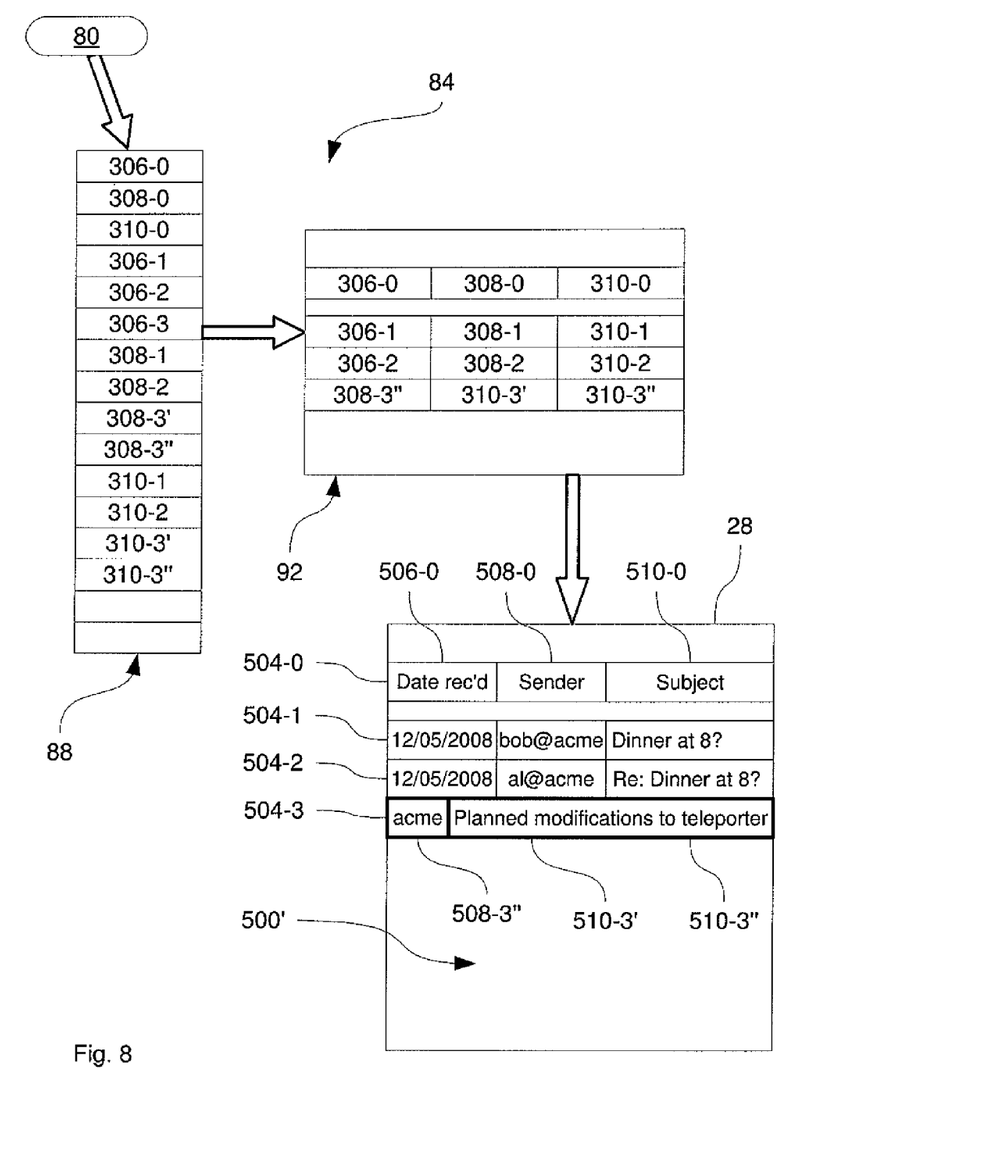
FIG. 8 shows an exemplary performance of block 445 of the method of FIG. 4.

Performance of block 445 is shown in FIG. 8. Display application 84 manages screen pre-buffer 88 to update screen buffer 92 with field 310-3". The entire "Subject" field of the message represented by data in row 304-3 of database 300 is now contained within screen buffer 92. Screen 500 is then regenerated on display 28 of portable electronic device 20. The updated version of screen 500 is shown as 500' in FIG. 8. It will be noted that row element 504-3 has been horizontally scrolled to the left in the FIG. to reveal the previously truncated "Subject" field. The series of the column sub-elements of row element 504-3 is maintained without reference to other row elements. In other words, the entirety of row element 504-3 is scrolled while row elements 504-0, 504-1 and 504-2 remain static.

As a result of the scrolling of row element 504-3, column sub-element 506-3 is no longer visible and column sub-element 508-3 is only partially visible. Field 306-3 is maintained in screen pre-buffer 88, but is no longer contained with screen buffer 92. Field 308-3 has also been divided in 308-3' and 308-3". Display application 84 may divide fields of database 300 in screen pre-buffer 88 in order to scroll a row element in a variety of ways. Fields of database 300 may be divided dynamically by Display application 84 in response to scrolling, as shown in FIG. 8. Alternatively, the fields of database 300 may be obtained by display application 84 for storage in screen pre-buffer 88 in a divided form during block 410 of method 400. Such division may be as fine or as coarse as desired. For example, screen pre-buffer 88 may be populated with fields of database 300 divided into data representing individual characters or portions of individual characters. Screen 500 may therefore be updated continuously at a wide variety of scrolling resolutions, as desired.

Figure 9:
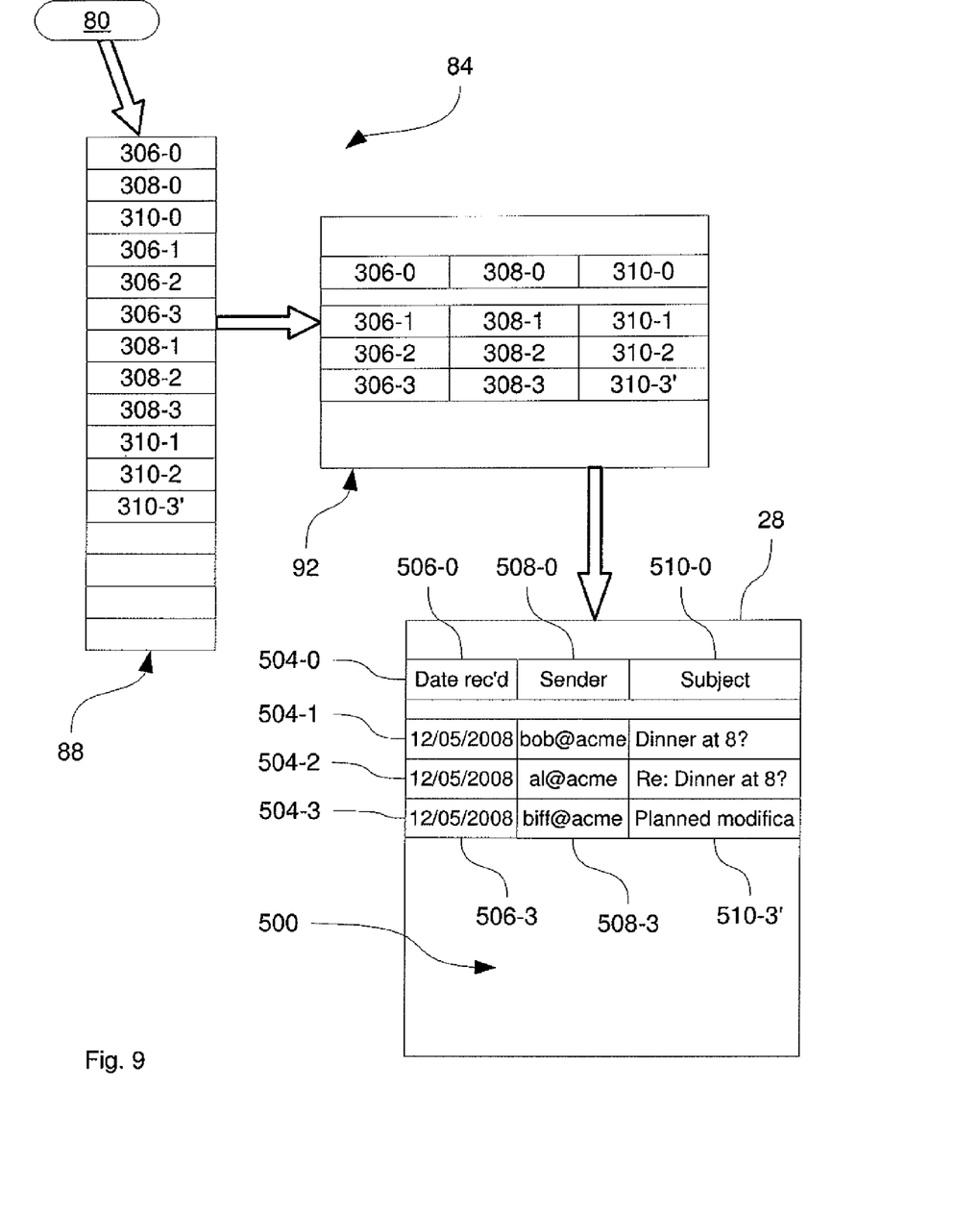
FIG. 9 shows an exemplary performance of block 430 of the method of FIG. 4.

Following performance of block 445, method 400 may return to block 425. Performance of blocks 430 and 435 will now be described, in the event that a "Yes" determination is made at block 425. Referring now to FIG. 9, selection or focus of a row element 504 of screen 500 may be lost during performance of method 400. As mentioned above, selection may, for example, be lost as a result of a different row element 504 being selected. Additionally, selection may be lost after a certain period of inactivity. For example, if no scrolling input is received at block 440 for a predetermined time period, the row selected at block 415 may automatically lose selection.

Upon a "Yes" determination being made at block 425, method 400 proceeds to block 430, at which display application 84 may "re-initialize" display 28. At block 430, display application 84 manages screen pre-buffer 88 and screen buffer 92 to purge the additional data obtained at block 420. As shown in FIG. 9, screen pre-buffer 88 and screen buffer 92 have been returned to the state found in FIG. 5, before scrolling was enabled. Memory resources of portable electronic device 20 are thus released for other uses. Completing the performance of block 430, screen 500' is updated and replaced with screen 500. It will be noted that in FIG. 9, row element 504-3 has been returned to its initial position, as seen in FIG. 5.

Returning to FIG. 4, method 400 advances to block 435, which terminates method 400. It will be understood that the performance of block 435 may be accompanied by a new performance of method 400, for example, if selection was lost at block 425 due to a different row element being selected.

Figure 10:
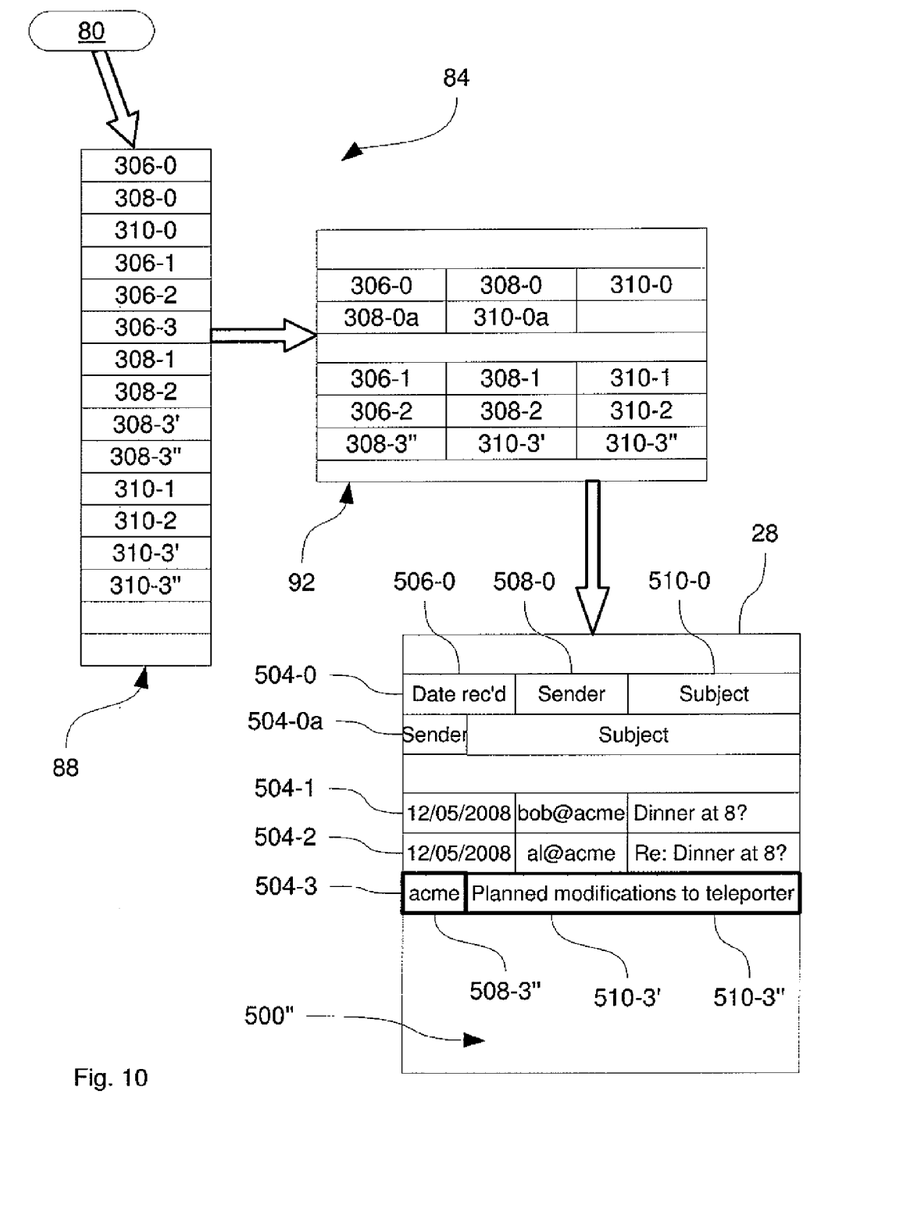
FIG. 10 shows a schematic performance of block 445 of the method of FIG. 4 according to a further non-limiting embodiment.

In another exemplary embodiment shown in FIG. 10, as part of the performance of block 445, display application 84 may manage screen pre-buffer 88 and screen buffer 92 to provide a second copy of row 304-0 (e.g. the header row) in screen buffer 92. As such, an alternate version of screen 500—indicated in FIG. 10 as 500"—may then be rendered, in which a secondary header row element 504-0a may be scrolled in a similar manner to the row element selected for scrolling.

In a further exemplary embodiment (not shown), a single column sub-element within a row element may be scrolled, rather than the entire row element. For example, the "Subject" column sub-element of a row element may be scrolled to display truncated information, while the remainder of the column sub-elements of the selected row element remain in their initial position.

Those skilled in the art will understand that subsets, combinations and variations of the foregoing are contemplated. The scope of the monopoly sought is defined by the claims attached hereto.

The invention claimed is:

1. A method of controlling a display of a portable electronic device, the method comprising: generating a screen on a display, the screen comprising a list having row elements and column sub-elements, at least a portion of one of the column sub-elements comprising truncated data; receiving a selection input for selecting a row element for scrolling; and upon receiving the selection input, enabling the display for continuous horizontal scrolling of the row element, wherein the series of the column sub-elements of the selected row element is maintained without reference to other row elements, further comprising: after receiving the selection input, receiving a further selection input for selecting a different row element; and updating the screen on the display to return the previously selected row element to an initial position, wherein the previously selected row is returned to the initial position after a predetermined time period.

2. A portable electronic device comprising: an input device; a display; a processor coupled to the display and configured for controlling the display, the processor configured to generate a screen on the display, the screen comprising a list having row elements and column sub-elements, at least a portion of one of the column sub-elements comprising truncated data; the processor further configured to receive a selection input from the input device for selecting a row element for scrolling; and upon receiving the selection input, to enable the display for continuous horizontal scrolling of the row element, wherein the series of the column sub-elements of the selected row element is maintained without reference to other row elements, the processor further being configured to receive a further selection input for selecting a different row element; and to update the screen on the display to return the previously selected row element to an initial position, the processor further being configured to return the previously selected row to the initial position after a predetermined time period.

* * * * *